Patented Feb. 23, 1937

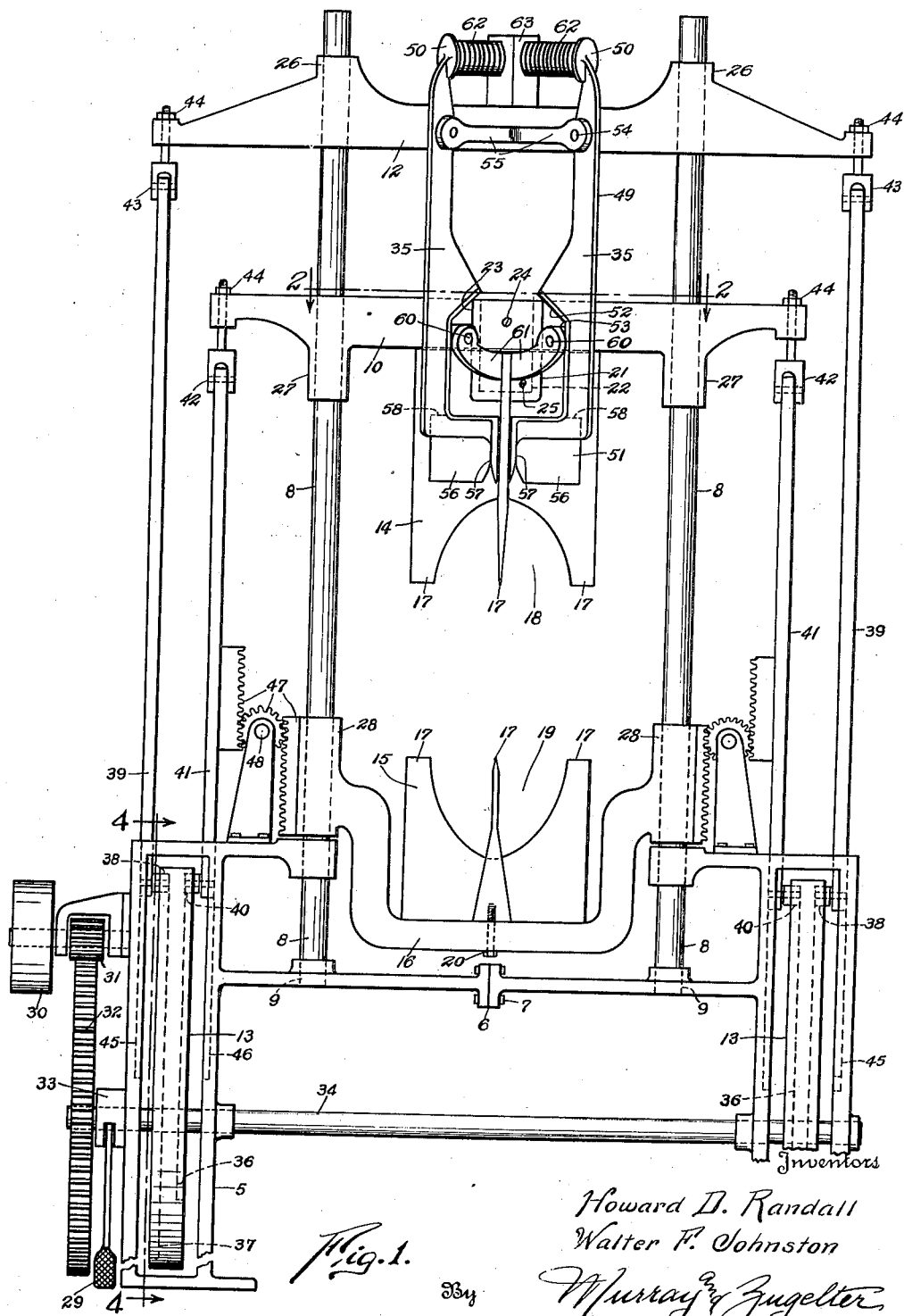

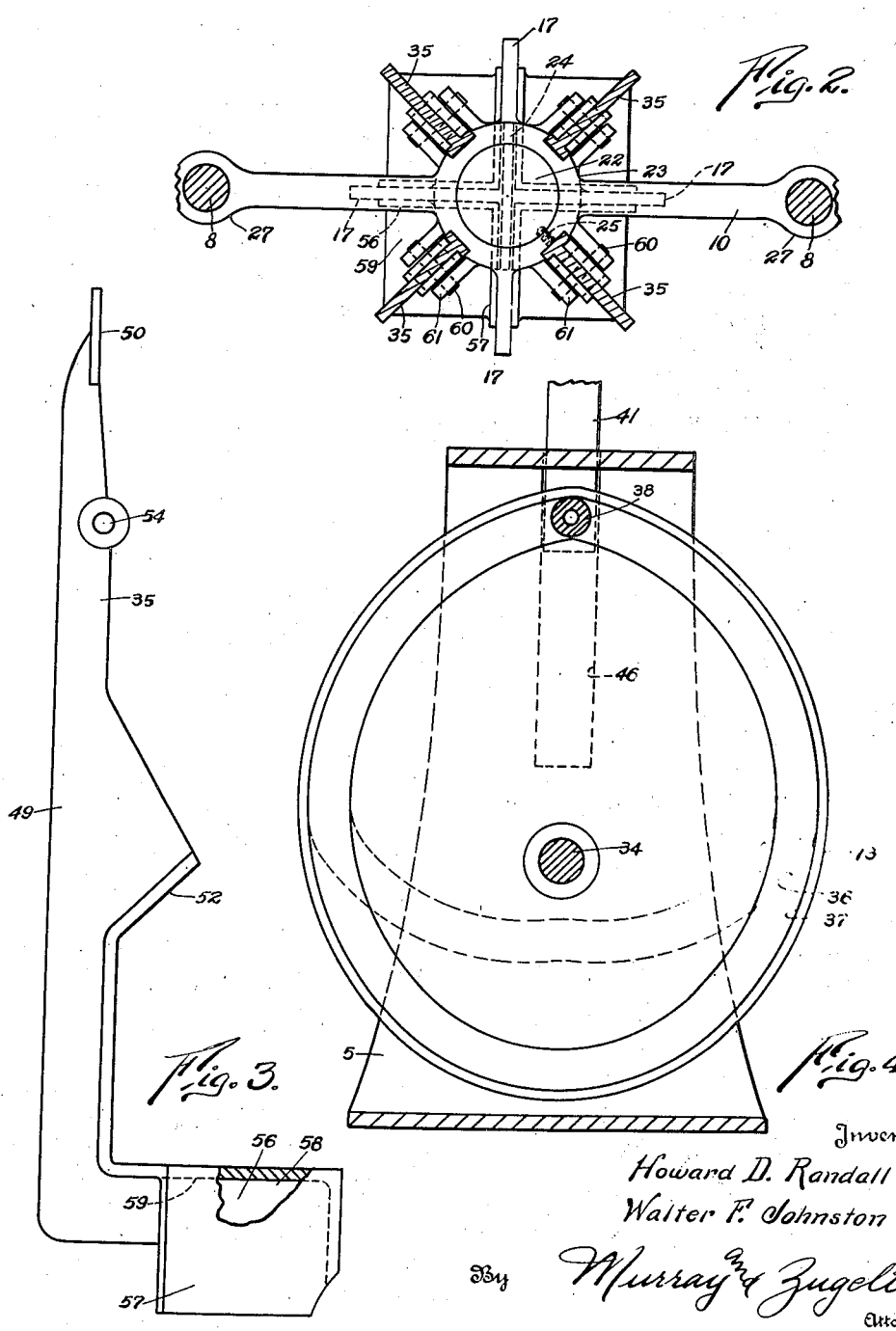

2,071,853

UNITED STATES PATENT OFFICE 2,071,853

NUT HULLING MACHINE

Howard D. Randall and Walter F. Johnston, Cincinnati, Ohio, assignors to The Randall Company, Cincinnati, Ohio, a corporation of Ohio Application May 18, 1934, Serial No. 726,326

12 Claims. (Cl. 146—10)

This invention relates to a nut hulling machine such as is adapted for operation upon cocoanuts and the like.

An object of the invention is to provide a simple and inexpensive yet effective means for removing the tough fibrous hulls from cocoanuts and the like.

Another object of the invention is to provide an arrangement of means for the purpose stated, which will operate successfully upon nuts of various sizes.

Another and more specific object of the invention is to provide a nut hulling device with novel and improved means for stripping the hull from the nut.

The foregoing and other objects are attained by the means described herein and disclosed in the accompanying drawings, in which:

Fig. 1 is an elevational view of the device of the invention.

Fig. 2 is a fragmental cross-sectional view taken on line 2—2 of Fig. 1.

Fig. 3 is an elevational view of a stripping element forming a detail of the invention.

Fig. 4 is a cross-sectional view taken on line 4—4 of Fig. 1.

In the mechanical hulling of nuts, such as cocoanuts and the like, there has existed a perplexing problem of effectively stripping the outer tough fibrous hull from the nut either during or after splitting of the hull. The stripping operation was heretofore performed generally by hand, after mechanically splitting the hull by means of reciprocating knives. One of the objects of the present invention is to eliminate practically all of the hand work connected with hulling nuts of the general character above mentioned.

With reference to the drawings, 5 indicates a frame, which preferably is made in two parts joined together as at 6 by means of bolts or other suitable fastening means 7. The frame has fixedly mounted thereon a pair of beam guides 8 which may be in the form of vertical standards fixed to the frame at the locations 9. A pair of vertical beams 10 and 12 are mounted upon the vertical guides and are adapted to be elevated and lowered by the action of one or more cams 13. Beam 10 may be referred to as the upper blade supporting beam, and beam 12 performs the function of a carriage or support for a hull stripping means. The upper cutting element or knife means is indicated by the character 14 whereas the lower cutter or knife element 15 is supported by a reciprocating cradle or support 16. Both cutting elements are removably fixed to their supports so as to provide for replacement or re-sharpening thereof.

Each of the cutter means 14 and 15 comprises a series of blades 17 having sharpened advancing edges, the blades being shaped so as to form between them the nut-receiving recesses of pockets 18 and 19. Although a series of four blades is shown herein, it is to be understood that a different number of blades may be employed for splitween them the nut-receiving recesses or pockets of the knife elements. One or more bolts 20 may be employed to support the lower knife in fixed relation to the cradle 16, and any suitable means may be employed for supporting the upper knife in fixed relation to the beam 10. As shown herein, the upper knife may include a hollow boss or the like 21 which supports a vertically extending stud 22 that has its upper end received in a bored boss 23 carried by the beam 10. Any suitable mean such as screws, pins or the like 24 and 25 may be employed to fix the stud relative to the beam and to the knife element 14. Each of the beams or supporting elements 10, 12 and 16 preferably is provided with sleeve or bearing means 26, 27, and 28, respectively, whereby the beams or supports may move in a vertical plane lengthwise of the guides or standards 8.

To use the machine of this invention, an operator first places a nut within the recess or pocket 19 of blade 15 and thereafter depresses a clutch lever or pedal 29 whereby rotational movement from a pulley 30 or other power source is transmitted, through a suitable gear train 31—32 and through any acceptable form of clutch 33, to rotate the cam shaft 34 upon which are fixed the cams 13. Engagement of the clutch effects a 360° rotation of the cams 13, whereby the knives and their supports 10 and 16 are moved toward each other for cutting and splitting the hull of the nut supported within the pockets 18 and 19. Immediately after the knife advancing operation, or shortly prior to completion of said advancing movement of the knives, the series of stripper elements 35 is actuated to follow the upper knife into the split hull and to thereafter move radially outwardly from the knife blades 17 so as to tear the hull from the enclosed nut. The stripper elements, as will be understood, perform the tearing or stripping operation that heretofore was accomplished by hand. After the nut has been stripped of its hull, the knives and stripping means return to the initial position shown in Fig. 1.

It is to be understood that any suitable driving means may be provided for the cams 13, and that the clutch 33 may be one of conventional design adapted, preferably, to have a stop-motion action whereby momentary depression of a pedal or lever such as 29 results in one complete rotation of the cam shaft 34.

As disclosed in Fig. 4, each of the cams 13 carries two cam grooves 36 and 37, these cam grooves being formed in opposite faces of the cam. Cam groove 37 is substantially elliptical in shape, and it serves to guide a cam follower or roller 38 which is rotatably fixed onto the lower end of a connecting rod or bar 39 which actuates the stripper supporting beam 12. The cam groove 36 may be substantially heart-shaped and is adapted to guide a cam follower or roller 40 which is rotatably mounted upon the lower end of a second connecting rod or bar 41, said rod 41 being operatively connected with the beam 10 for advancing the upper knife element to an operative position adjacent to the lower knife element 15. It is preferable to provide pivotal mounting means 42 and 43 for connecting the upper ends of the connecting rods to the outer ends of the beams 10 and 12. The pivotal mounting may be rendered adjustable by the use of adjusting nuts 44, to adjust the movement of the beams along the guides or standards 8. The frame or any other stationary part of the machine may be provided with suitable guides or channels 45 and 46 the function of which is to guide the rods or connecting bars 39 and 41 during their vertical reciprocating movements.

It is to be noted that the cam rollers 40, upon rotation of the cams 13, will be lowered so as to force the connecting rods 41 downwardly to lower the beam 10 and the knife element 14. Simultaneously with said lowering of the upper knife element, the lower knife element 15 and its support 16 are elevated by means of a rack and pinion arrangement 47. The racks are fixed upon the parts 41 and 28 and the engaging pinion between the racks is mounted for rotation upon a stud 48. Thus the upper and lower knife elements are advanced toward each other through equal distances, until the blades thereof meet, or until they slightly pass one another.

The means for actuating the strippers will now be described. Each stripper element preferably is constituted of a longitudinal lever portion 49 having a spring seat 50 at its upper end and a stripping blade structure 51 at its lower end. Intermediate the ends 50 and 51 is provided an inclined cam face 52 which is adapted to ride upon a roller 53. At a point intermediate the cam face and the spring seat, the lever portion is pivoted, as at 54, upon an extending bracket 55 fixed relative to the beam 12. The stripping blade means at the lower end of each stripper element comprises a pair of integral vertical walls or slide members 56 and 57 which are adapted to slide upon the faces of adjacent blade members 17. Where four blade members 17 are employed, said members preferably are disposed at right angles to one another, and the walls or sliding parts 56 and 57 of the stripper element likewise are at right angles to one another. The lower edges of the walls 56 and 57 may be sharpened, as shown. The stripper walls 56 and 57 are connected at their upper ends 58 by means of a substantially horizontal web 59 (Fig. 3), the web thereby being also at right angles to each of the angularly disposed walls or stripping blades 56 and 57. The lever portion 35 of the stripper element is seen, by reference to Fig. 2, to be included in the angle between the stripping blades 56 and 57. The rollers or cam followers 53 are rotatably mounted upon studs or pins 60 which are supported in suitable brackets 61 fixed relative to the upper plate element and the beam 10. The brackets 61, therefore, are located directly below the brackets 55.

From the foregoing it will be understood that movement of the beam 12 toward the beam 10 will cause the stripper elements 35 to descend relative to beam 10, whereby to cause the cam faces 52 to ride downwardly upon the cam rollers 53 and thus force the stripper elements outwardly from the blades by reason of the resultant rocking movement of elements 35 about their pivots 54. The outward movement of the stripper elements is resisted by means of the compression springs 62, the ends of which springs abut the spring seats 50 and the adjacent faces of a fixed spring abutment 63 carried by the beam 12. The springs 62 thereby perform the function of returning the stripper elements to the initial retracted position shown in Fig. 1, upon predetermined movement of the beams 10 and 12 in opposite directions.

The operation of the device is as follows. An attendant first places a nut in the pocket 19 of blade member 15 in an upright position, after which he momentarily depresses the clutch lever 29 for imparting a complete rotation of the cam wheels 13. As the cams begin to rotate, the beams 10 and 12 and cradle 16 are moved toward each other until the sharpened ends of the cutter blades reach a substantially meeting position. Simultaneously with the downward movement of the beam 10, the beam 12 moves downwardly in unison therewith and at an equal speed, so that the stripper elements move bodily downwardly with the knife element 14. At substantially the instant that the blades assume the meeting position, the elliptical cam operates upon the roller 38 and its associated connecting rod 39 to continue the downward movement of beam 12 and the stripper elements associated therewith. As beam 12 advances toward the then stationary beam 10, the cam faces 52 of the stripping elements ride downwardly over the cooperative cam rollers 53 whereby to extend or expand the stripping mechanism radially of the upper knife element for the purpose of tearing the hull away from the enclosed nut. Upon return of the parts to the initial position of Fig. 1, the upper beam 12 moves upwardly in advance of the beam 10, so as to restore the initial positions of the stripper elements, and thereafter both beams 10 and 12 move upwardly in unison until they reach the initial or starting position of Fig. 1. At the instant the initial position is reached, the clutch 33 automatically is disengaged, thereby rendering the machine ready for a subsequent hulling operation. Attention is directed to the fact that the substantially horizontal webs 59 of the stripper elements serve as abutments which contact the severed upper portions of the nut hull, after the hull has been split and the downward forceful movement of the webs while contacting said hull portions effects a downward tearing operation of the hull from the nut while at the same time the strippers are moving outwardly to tear the hull radially from the nut. By this means, the hull may be stripped clean from the nut.

It is to be understood that various modifications and changes in the structural details of the device may be made, within the scope of the appended claims, without departing from the spirit of the invention.

What is claimed is:

1. A nut hulling machine comprising in combination, a frame, a pair of relatively movable beams movable toward and from the frame, a guide means mounted upon the frame and associated with the beams for guiding the beams in their said movement, a group of radially disposed blades normally fixed relatively to one of the beams, a group of strippers pivoted upon the other beam, said strippers having heads lying normally between and against the radially disposed blades, a second group of blades supported in substantial alignment with the first group of blades, means for holding a nut in position to be operated upon by the blades, means including a driven cam and a connecting rod in parallelism with the aforesaid guide means, for moving the blade supporting beam and its blades toward the second mentioned blade group, means for moving the strippers and their supporting beam substantially in unison with the blade supporting beam through a portion of the beam travel, means for continuing the stripper beam travel upon completion of the advancement of the blade supporting beam, means operating during said continued movement of the stripper beam, for moving the strippers first along and then radially outwardly of the blades, and abutments carried by the strippers for applying force to the hull to completely sever it from the nut after the blades split the hull.

2. A nut hulling machine comprising in combination a frame, a pair of beams movable toward and from the frame, a guide means mounted upon the frame and associated with the beams for guiding the beams in their said movement, a group of radially disposed blades normally fixed relative to one of the beams, a group of strippers pivoted relative to the other beam, for movement radially of the blades, a second group of blades supported in substantial alignment with the first group of blades, means for holding a nut in position to be operated upon by the blades, means for moving the blade supporting beam and its blades toward the second mentioned blade group, means for moving the strippers and their supporting beam substantially in unison with the blade supporting beam through a portion of the beam travel, means for continuing the stripper beam movement after completion of the advancement of the blade supporting beam, and means operating during said continued movement of the stripper beam, for moving the strippers radially outwardly of the blades.

3. A nut hulling machine comprising in combination, a frame, a pair of beams movable toward and from the frame, a guide means mounted upon the frame and associated with the beams for guiding the beams in their said movement, a group of radially disposed blades normally fixed relative to one of the beams, a group of strippers pivoted relative to the other beam, for movement radially of the blades, a second group of blades supported in substantial alignment with the first group of blades, means for holding a nut in position to be operated upon by the blades, means for moving the blade supporting beam and its blades toward the second mentioned blade group, means for moving the strippers and their supporting beam substantially in unison with the blade supporting beam through a portion of the beam travel, means for continuing the stripper beam movement after completion of the advancement of the blade supporting beam, and means operating during said continued movement of the stripper beam, for moving the strippers first lengthwise of and then radially outwardly of the blades.

4. A nut hulling machine comprising in combination, a frame, a pair of relatively movable beams movable toward and from the frame, a guide means mounted upon the frame and associated with the beams for guiding the beams in their said movement, a group of radially disposed blades normally fixed relatively to one of the beams, a group of strippers pivoted upon the other beam, said strippers having heads lying normally between and against the radially disposed blades, a second group of blades supported in substantial alignment with the first group of blades, means for holding a nut in position to be operated upon by the blades, means including a driven cam and a connecting rod in parallelism with the aforesaid guide means, for moving the blade supporting beam and its blades toward the second mentioned blade group, means for moving the strippers and their supporting beam substantially in unison with the blade supporting beam through a portion of the beam travel, means for continuing the stripper beam travel upon completion of the advancement of the blade supporting beam, means operating during said continued movement of the stripper beam, for moving the strippers first along and then radially outwardly of the blades.

5. A nut hulling machine comprising in combination, a frame, a pair of relatively movable beams movable toward and from the frame, a guide means mounted upon the frame and associated with the beams for guiding the beams in their said movement, a group of radially disposed blades normally fixed relatively to one of the beams, a group of strippers pivoted upon the other beam, said strippers having heads lying normally between and against the radially disposed blades, a supporting means for a nut disposed in the path of movement of the group of blades, means including a driven cam and a connecting rod in parallelism with the aforesaid guide means, for moving the blade supporting beam and its blades toward the nut supporting means, means for moving the strippers and their supporting beam substantially in unison with the blade supporting beam through a portion of the beam travel, means for continuing the stripper beam travel upon completion of the advancement of the blade supporting beam, means operating during said continued movement of the stripper beam, for moving the strippers first along and then radially outwardly of the blades.

6. A nut hulling machine comprising in combination a frame, a pair of beams movable toward and from the frame, a guide means mounted upon the frame and associated with the beams for guiding the beams in their said movement, a group of radially disposed blades normally fixed relative to one of the beams, a group of strippers pivoted relative to the other beam, for movement radially of the blades, a supporting means for a nut disposed in the path of movement of the group of blades, means for moving the blade supporting beam and its blades toward the nut supporting means, means for moving the strippers and their supporting beam substantially in unison with the blade supporting beam through a portion of the beam travel, means for continuing the stripper beam movement after completion of the advancement of the blade supporting beam, and means operating during said continued movement of the stripper beam, for moving the strippers radially outwardly of the blades.

7. A nut hulling machine comprising in combination, a frame, a pair of beams movable toward and from the frame, a guide means mounted upon the frame and associated with the beams for guiding the beams in their said movement, a group of radially disposed blades normally fixed relative to one of the beams, a group of strippers pivoted relative to the other beam, for movement radially of the blades, a supporting means for a nut disposed in the path of movement of the group of blades, means for moving the blade supporting beam and its blades toward the nut supporting means, means for moving the strippers and their supporting beam substantially in unison with the blade supporting beam through a portion of the beam travel, means for continuing the stripper beam movement after completion of the advancement of the blade supporting beam, and means operating during said continued movement of the stripper beam, for moving the strippers first lengthwise of and then radially outwardly of the blades.

8. A nut hulling machine comprising in combination, a group of radially disposed blades having a pocket therebetween for reception of a nut to be hulled, a second group of radially disposed blades, means for moving the blades relatively for splitting the hull of the nut held by the pocket, radially movable strippers to enter the splits in the hull, abutments on the strippers for striking the hull ends after initiation of the stripping operation, and means for advancing said abutments sufficiently to force the split hull parts longitudinally of the splits therein.

9. A nut hulling machine comprising in combination a holder for the nut, a group of blades positively driven toward and into the hull of the nut for splitting the hull thereof, strippers traveling with and following the blades into the splits of the hull, and means for forcing the strippers radially outwardly of the nut as the blades advance in the general direction of the nut holder, to strip the hull from the nut.

10. A nut hulling machine comprising in combination a holder for the nut, a group of blades positively advanced toward and into the hull of the nut for splitting the hull thereof, strippers traveling with and following the blades into the splits of the hull, means for forcing the strippers radially outwardly of the nut as the blades advance in the general direction of the nut holder to loosen the hull, and means associated with the blade group for forcefully driving the hull past the nut axially of the nut.

11. A nut hulling machine comprising in combination a holder for the nut, a group of blades movable toward and into the hull of the nut for splitting the hull thereof, strippers traveling in parallelism with the blades and arranged to enter the splits of the hull, means for moving the strippers radially outwardly of the nut after entry thereof into the splits of the hull, and means for applying a force to an end of each hull section formed by the splitting operation, to stretch the hull fibers abnormally in the general direction of the major axis of the nut, for breaking the fibers.

12. A nut hulling machine comprising in combination, a group of radially disposed blades having a pocket formed therebetween for holding a nut to be hulled, a second group of blades and means for moving the blade groups relatively to cause them to enter and split the hull of the nut, stripping means adapted to enter between the nut and the split hull thereof, means for expanding the stripping means laterally outwardly after entry thereof between the hull and the nut, for tearing the hull fibers from the nut, and means for applying an endwise force to the split hull parts in the general direction of the splits, for breaking the hull away from the nut by abnormally stretching the hull fibers in the direction of their length.

HOWARD D. RANDALL.
WALTER F. JOHNSTON.